United States Patent
Zang et al.

(10) Patent No.: US 11,353,841 B2
(45) Date of Patent: Jun. 7, 2022

(54) METHOD FOR OPERATING AN APPLICATION PROGRAM FOR EXECUTING IN AN ELECTRIC CONTROL UNIT FOR A DRIVE SYSTEM, ELECTRIC CONTROL UNIT, DRIVE SYSTEM AND SYSTEM

(71) Applicant: Lenze Automation GmbH, Aerzen (DE)

(72) Inventors: Eduard Zang, Hannover (DE); Mathias Stoewer, Laatzen (DE); Jan Mittelstaedt, Hannover (DE); Maikel Kling, GX Schaijk (NL)

(73) Assignee: Lenze Automation GmbH, Aerzen (DE)

( * ) Notice: Subject to any disclaimer, the term of this patent is extended or adjusted under 35 U.S.C. 154(b) by 31 days.

(21) Appl. No.: 16/644,067

(22) PCT Filed: Aug. 9, 2018

(86) PCT No.: PCT/EP2018/071670
§ 371 (c)(1),
(2) Date: Mar. 3, 2020

(87) PCT Pub. No.: WO2019/042736
PCT Pub. Date: Mar. 7, 2019

(65) Prior Publication Data
US 2021/0072719 A1    Mar. 11, 2021

(30) Foreign Application Priority Data
Sep. 4, 2017 (DE) .................... 10 2017 215 449.7

(51) Int. Cl.
*G05B 19/05* (2006.01)
*G06F 9/445* (2018.01)

(52) U.S. Cl.
CPC ......... *G05B 19/05* (2013.01); *G06F 9/44505* (2013.01); *G05B 2219/23265* (2013.01)

(58) Field of Classification Search
CPC .......... G05B 19/05; G05B 2219/23265; G06F 9/44505
See application file for complete search history.

(56) References Cited

U.S. PATENT DOCUMENTS

2006/0206219 A1\* 9/2006 Brown ................... B25J 9/1602
                                                              700/56
2009/0070575 A1    3/2009 Ehlich
(Continued)

FOREIGN PATENT DOCUMENTS

DE           295 18 646 U1    2/1997
DE     10 2005 032 075 A1     1/2007
(Continued)

OTHER PUBLICATIONS

International Search Report (PCT/ISA/210) issued in PCT Application No. PCT/EP2018/071670 dated Nov. 14, 2018 with English translation (four (4) pages).
(Continued)

Primary Examiner — Phillip H Nguyen
(74) Attorney, Agent, or Firm — Crowell & Moring LLP

(57) ABSTRACT

A method for operating an application program for executing in an electric control unit for a drive system includes managing at least one application parameter using an application parameter manager.

9 Claims, 1 Drawing Sheet

(56) References Cited

U.S. PATENT DOCUMENTS

| | | | |
|---|---|---|---|
| 2009/0083589 A1 | 3/2009 | Fulton et al. | |
| 2009/0144647 A1* | 6/2009 | Chandhoke | G06F 8/00 715/772 |
| 2015/0045931 A1* | 2/2015 | Mizuno | G05B 19/0426 700/114 |
| 2016/0299485 A1* | 10/2016 | Brown | H04L 67/02 |
| 2018/0032047 A1* | 2/2018 | Nishizono | G05B 19/0426 |

FOREIGN PATENT DOCUMENTS

| | | |
|---|---|---|
| DE | 10 2012 205 708 A1 | 10/2013 |
| DE | 10 2008 053 557 B4 | 7/2017 |
| EP | 2 648 056 A2 | 10/2013 |
| EP | 3 229 086 A1 | 10/2017 |

OTHER PUBLICATIONS

German-language Written Opinion (PCT/ISA/237) issued in PCT Application No. PCT/EP2018/071670 dated Nov. 14, 2018 (five (5) pages).

\* cited by examiner

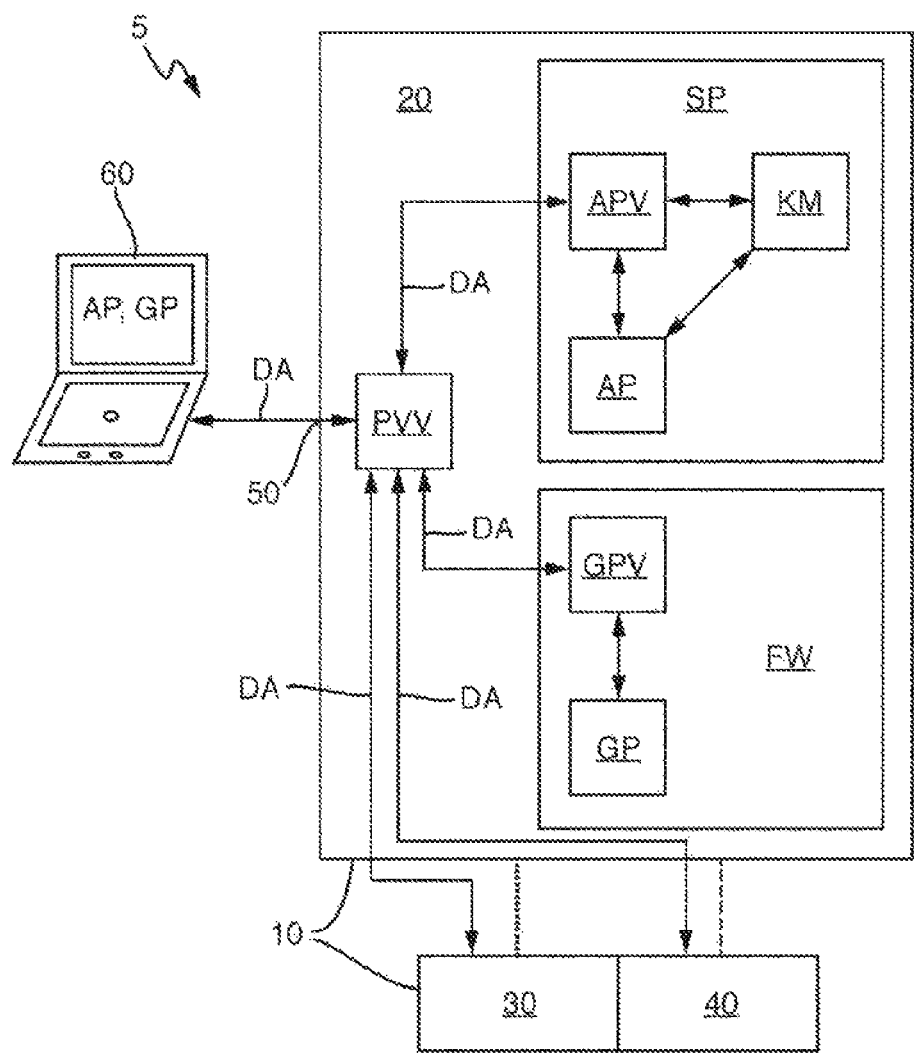

METHOD FOR OPERATING AN APPLICATION PROGRAM FOR EXECUTING IN AN ELECTRIC CONTROL UNIT FOR A DRIVE SYSTEM, ELECTRIC CONTROL UNIT, DRIVE SYSTEM AND SYSTEM

BACKGROUND AND SUMMARY OF THE INVENTION

The invention relates to a method for operating an application program for execution on an electrical control unit for a drive system, to an electrical control unit, to a drive system having an electrical control unit of this kind and to a system having an electrical control unit of this kind and/or a drive system of this kind.

A method for operating an application program for execution on an electrical control unit for a drive system, an electrical control unit, a drive system having an electrical control unit and a system having an electrical control unit and/or a drive system are known.

The invention is based on the object of providing a method for operating an application program for execution on an electrical control unit for a drive system that facilitates operation of the application program. In addition, the invention is based on the object of providing an electrical control unit, a drive system having an electrical control unit of this kind and a system having an electrical control unit of this kind and/or a drive system of this kind.

The invention achieves this object by providing a method for operating an application program for execution on an electrical control unit for a drive system, having the step of: managing at least one application parameter by way of an application parameter manager. In addition, the object on which the invention is based is achieved by an electrical control unit for a drive system, having: an application program for execution on the electrical control unit, and an application parameter manager for managing at least one application parameter, as well as a drive system having the electrical control unit and a system having electrical control unit and a user operable control device.

The, in particular automatic, method according to the invention for operating an application program for execution on an electrical control unit for an, in particular electrical, drive system has the step of: managing, in particular automatically managing, at least one application parameter, in particular a plurality of application parameters, by way of an application parameter manager.

The application program can be referred to as application software, application, in particular customer application, or control program. The application program can be application-specific or application-individualized or customer-specific. In particular, the application program can be a PLC-based program (PLC: programmable logic control unit).

Additionally, the application program can be present or stored on or in the electrical control unit, in particular on a removable storage medium such as an SD card in the control unit.

The electrical control unit can be designed to execute, in particular to automatically execute, the application program. In particular, the electrical control unit can have a microprocessor and/or a field programmable gate array (FPGA) for executing the application program.

Further, the electrical control unit can be part of the drive system. Additionally or alternatively, the drive system can be part of an installation, in particular a production installation.

The application parameter can have a variable application parameter value. The management can involve adjusting and storing the set application parameter value. The management can be repeated, in particular multiple times. In particular, an application parameter file can have the at least one application parameter, wherein the content of the application parameter file can be interpreted by the application program at the time of execution, if need be when the program starts. The application parameter can be referred to as application-specific parameter or parameter of the application program.

The application parameter manager can have or contain or access at least one parameter of the application program. Put another way: the application parameter manager can communicate with the application program. By way of example, the application parameter can be a limit value, a setpoint value for a web speed, a setpoint value for an acceleration, a temperature, a web length, etc., for an application such as a winder application or a table positioning application or a rack server application.

The application parameter manager can be designed or configured to manage the at least one application parameter. By way of example, the application parameter manager can check the application parameter, for example for compliance with a limit value. In particular, the application parameter manager can be designed or configured to make a connection between the at least one application parameter and at least one variable of the application program. In other words: the application parameter manager can know an association, in particular an addressing, between the at least one application parameter and at least one variable of the application program, or the association can be stored in the application parameter manager. The application parameter manager can be referred to as application parameter administrator.

Moreover, the application parameter manager can be designed to manage only or exclusively the at least one application parameter. To put it another way: the application parameter manager does not need to be designed to manage at least one device parameter, where available. Additionally or alternatively, the application parameter manager can be produced apart or separately from a device parameter manager, where available. Additionally or alternatively again, the application parameter manager does not need to be added to firmware, where available, on the electrical control unit. In particular, the application parameter manager, like the application program, can run on the firmware, or be executed by means of said firmware.

The method allows the application program to be independent of the electrical control unit. The electrical control unit does not need to have a parameter manager, in particular an application parameter manager, before operation of the application program, in particular before management of the at least one application parameter. It is therefore possible for operation of the application program to be facilitated.

In one development of the invention, the application parameter manager is added to the application program. Put another way: the application parameter manager can be firmly connected to the application program in functional terms. The application program and the application parameter manager can form a package, in particular a file package. In particular, the application parameter manager can be integrated in the application program, or be part of the application program. The application program and the application parameter manager can be in one file.

This allows the application program to be independent of the electrical control unit. This facilitates operation of the application program on the electrical control unit, in particular during porting of the application program, in particular with the at least one application parameter, from another electrical control unit or another platform to the electrical control unit. In addition, this simplifies a simulation of the application program, in particular with the at least one application parameter. Additionally, this allows or simplifies at least the execution of at least one other application program besides or in parallel with the execution of the one application program on the electrical control unit. By way of example, should it actually ever happen that two different application programs have one and the same application parameter, this allows the two application programs to have different limit values for the application parameter. Otherwise, this does not need to be the case. Just one limit value could be rendered possible.

Prior to this, in particular before operation, the application program can be or may have been created, in particular by means of a method for creating the application program, wherein the application parameter manager can be or may have been added to the application program during creation of the application program.

In one development of the invention, the method has the steps of: defining, in particular automatically defining, the at least one application parameter by means of the application program; making the at least one defined application parameter available, in particular automatically making it available, to the application parameter manager by means of a pilot module. The pilot module is added to the application program, in particular integrated into the application program. This allows the at least one, in particular defined, application parameter to be managed by means of the application parameter manager. The pilot module can be designed or configured to make the at least one defined application parameter available to the application parameter manager. In other words: the pilot module can be a defined piece of program code that can define prescribed functions for at least one portion of the drive system. The pilot module can be referred to as software shell.

Prior to this, in particular before operation, the application program can be or may have been created, in particular by means of a method for creating the application program, wherein the pilot module can be or may have been added to the application program during creation of the application program.

In one development of the invention, the method has the step of: managing, in particular automatically managing, at least one device parameter, in particular a plurality of application parameters, by means of a device parameter manager. The device parameter manager is added to firmware on the electrical control unit, in particular integrated into the firmware.

Firmware can typically be software that can be embedded into the electrical control unit. The firmware can be stored in a flash memory, an EPROM, an EEPROM or ROM of the electrical control unit, for example, and can be removable or replaceable by a user or operator not at all or only using specific means or functions. The term firmware stems from the firmware being able to be firmly connected to the hardware, in particular the electrical control unit, in functional terms. The firmware can typically adopt an intermediate position between hardware of the electrical control unit and the application program, which may be relatively easily removable or replaceable.

The device parameter can have a variable device parameter value. The management can involve adjusting and storing the set device parameter value. The management can be repeated, in particular multiple times. The management of the device parameter value can be carried out at the same time as the management of the application parameter and/or at a time before and/or after said management. In particular, a device parameter file can have the at least one device parameter. The device parameter file can be produced apart or separately from the application parameter file, where available. The device parameter can be referred to as device-specific parameter. In other words: the device parameter manager can have or include at least one parameter of the electrical control unit and/or of the drive system, in particular of the electrical drive system, or of its firmware. Additionally, the electrical control unit can be designed to control an actuator, in particular an electric motor, of the drive system, and the device parameter manager can have or include at least one parameter of the actuator. By way of example, the device parameter can be a power, a maximum current, a rated speed of the electric motor, where available, a field bus parameter, such as a station name and/or an IO address, a transmitter parameter, such as a number of pool pairs, and/or a supply voltage, a safety parameter, etc.

The device parameter manager can be designed or configured to manage the at least one device parameter. In particular, the device parameter manager can be designed to manage only or exclusively the at least one device parameter. Put another way: the device parameter manager does not need to be designed to manage the at least one application parameter. In addition, the device parameter manager does not need to be added to the application program. Additionally, the device parameter manager can be referred to as device parameter administrator.

This allows the at least one device parameter to be managed independently of the at least one application parameter. Once the at least one device parameter has been managed, it normally does not need to be managed again, unless there is a change of hardware.

In one refinement of the invention, the method has the step of: distributing, in particular automatically distributing, data from outside the electrical control unit relating to the at least one application parameter or the at least one device parameter by means of a parameter manager distributor on the electrical control unit. The parameter manager distributor distributes data relating to the at least one device parameter to the device parameter manager and distributes data relating to the at least one application parameter to the application parameter manager.

The data can be used to access the applicable parameter. In particular, the data can be requests for the parameter or a parameter value, in particular one that is to be adjusted. The distribution step can be a substep of management.

The electrical control unit can have one or more interfaces, such as an Ethernet port or a field bus port, by means of which the data can get into the electrical control unit, in particular to its parameter manager distributor, from outside. From there, the data can be forwarded to the applicable manager. From outside can mean in particular from the user.

The parameter manager distributor can be designed or configured to distribute data relating to the at least one device parameter to the device parameter manager and to distribute data relating to the at least one application parameter to the application parameter manager. In particular, the parameter manager distributor can know all the parameters of the respective manager and their parameters, in particular parameter addresses, or this can be stored in the parameter manager distributor. It is at least possible for the parameter manager distributor to know the at least one device parameter. If data relating to an unknown parameter get to the parameter manager distributor, the parameter manager distributor can assume that the data must relate to the at least one application parameter. In addition, the parameter manager distributor can be added to the firmware on the electrical control unit, in particular integrated into the firmware. Additionally, the parameter manager distributor can be referred to as switch.

In one development of the invention, the electrical control unit is a frequency converter, a servo converter, a motion controller or a Visu controller. Typically, motion controllers are electrical control units for automatic motion control or motion control by means of which a pose, a speed, an acceleration or a combination of these can be influenced. A typical application is automatic point-to-point position control and automatic speed control, for example. Typically, Visu controllers are electrical control units that can be designed for IPC visualization. In particular, the electrical control unit can have or be a converter with an integrated controller. This can be referred to as drive-based system (DBA), provided that the controller integrated in the converter can control or does control the drive system. Alternatively, the electrical control unit can have or be a converter and a controller apart from the converter, wherein the converter and the controller can be couplable or coupled to one another, for example by means of a, in particular synchronized, field bus, such as EtherCAT. This can be referred to as controller-based system (CBA).

In addition, the invention relates to an electrical control unit for a drive system. The electrical control unit according to the invention has the application program for execution on the electrical control unit and the application parameter manager for managing the at least one application parameter, at least during operation, in particular during execution of the application program.

The electrical control unit can allow the same advantages as the method described prior to this. In particular, the electrical control unit can be designed in part or even wholly as described for the method prior to this. In addition, the electrical control unit can be designed to carry out, in particular to automatically carry out, parts of the method described prior to this or even the whole method.

In one development of the invention, the electrical control unit has the device parameter manager for managing the at least one device parameter. The device parameter manager is added to the firmware on the electrical control unit.

Additionally, the invention relates to a, in particular electrical, drive system. The drive system according to the invention has an actuator, in particular an electric motor, and the electrical control unit. The electrical control unit is designed to control, in particular to automatically control, the actuator.

The drive system can allow the same advantages as its electrical control unit. In particular, the drive system can be designed in part or even wholly as described for the method prior to this.

Additionally, the drive system can have a sensor. The sensor can have the control unit and additionally the actuator associated with it. In particular, the control unit can be designed to take a sensor signal of the sensor as a basis for controlling the actuator.

Further, the invention relates to a, in particular electrical, system. The system according to the invention has the electrical control unit and/or the drive system. Additionally, the system has a user-operable control device for the user to manage the at least one application parameter and/or the at least one device parameter, where available.

This allows management. In addition, the system can have the same advantages as its electrical control unit and/or its drive system.

In particular, the user-operable control device can have an output device, in particular a display such as a screen, for outputting, in particular for displaying, the at least one application parameter and/or the at least one device parameter. In addition, the user-operable control device can have an adjusting device for adjusting the at least one application parameter and/or the at least one device parameter, in particular an input device such as a keyboard, a mouse and/or a touchscreen. Additionally, the electrical control unit and/or the drive system can have the user-operable control device. Additionally or alternatively, the user-operable control device can be produced apart from the electrical control unit and/or the drive system and can be designed for data connection, in particular for data interchange, with said control unit and/or drive system, in particular couplably.

Moreover, the invention relates to an, in particular electrical, apparatus. The apparatus according to the invention has a creating program for creating the previously described application program for execution on the previously described electrical control unit for the previously described drive system. The application program created can then be operated as described prior to this. In particular, the creating program can be designed or configured to set at least one application parameter in the application program. In addition, the creating program can be designed to add the application parameter manager to the application program. The apparatus can have or be a computer, a server and/or a data carrier. In particular, the apparatus can be designed to execute the creating program.

Further advantages and aspects of the invention emerge from the claims and from the description that follows for preferred exemplary embodiments of the invention, which are explained below on the basis of the figures.

BRIEF DESCRIPTION OF THE DRAWINGS

FIG. 1 shows a system according to the invention with a drive system according to the invention with an electrical control unit according to the invention when carrying out a method according to the invention.

DETAILED DESCRIPTION OF DRAWINGS

FIG. 1 shows a system 5 according to the invention. The system 5 has a, in particular electrical, drive system 10. The drive system 10 has an electrical control unit 20 according to the invention and an actuator 30 in the form of an electric motor. The control unit 20 is designed to control the actuator 30. In detail, the control unit 20 is electrically connected to the actuator 30, as indicated in FIG. 1 by a dotted line.

In the exemplary embodiment shown, the electrical control unit 20 is a frequency converter. In alternative exemplary embodiments, the control unit is a servo converter, a motion controller or a Visu controller. In addition, a DBA system is shown in the present case. In alternative exemplary embodiments, a CBA system can additionally or alternatively be present.

Additionally, the drive system 10 has a sensor 40. The sensor 40 has the electrical control unit 20 and additionally the actuator 30 associated with it. The control unit 20 is designed to take a sensor signal, not depicted, of the sensor 40 as a basis for controlling the actuator 30. In detail, the control unit 20 is in signal contact with the sensor 40, as indicated in FIG. 1 by a dashed line.

In alternative exemplary embodiments, the drive system can have more than the one electrical control unit, in particular at least two, in particular at least five, in particular at least ten. In particular, the control unit in the case of a CBA system can have a controller and just a single or more than one converter, in particular at least two, in particular at least five, in particular at least ten. Additionally, the drive system in alternative exemplary embodiments can have more than the one actuator, in particular at least two, in particular at least five, in particular at least ten. Further, the drive system in alternative exemplary embodiments can have more than the one sensor, in particular at least two, in particular at least five, in particular at least ten. The control unit can have more than the one associated actuator, for example for the case of what are known as two- or multiple-axis applications. Moreover, the control unit can have more than the one associated sensor.

A method according to the invention for operating an application program SP in the form of a PLC-based program for execution on the electrical control unit 20 for the drive system 10 has the step of: managing at least one application parameter AP by way of an application parameter manager APV. In detail, the application parameter manager APV is designed to manage the at least one application parameter AP.

The electrical control unit 20 according to the invention for the drive system 10 has the application program SP for execution on the control unit 20 and the application parameter manager APV for managing the at least one application parameter AP. In detail, the control unit 20 is designed to execute the application program SP to operate the drive system 10. In addition, the system 5 or its drive system 10 or its control unit 20 is designed to carry out the method.

In the exemplary embodiment shown, the electrical control unit 20 has the one application program SP. In alternative exemplary embodiments, the control unit can have more than one application program, in particular at least two, in particular at least five, in particular at least ten. Additionally, the control unit can be designed to execute multiple, in particular different, application programs, in particular with different and/or at least to some extent the same application parameter/s, beside one another or in parallel.

In detail, application parameter manager APV is added to the application program SP, in particular integrated into the application program SP. In alternative exemplary embodiments, the application parameter manager does not need to be added to the application program.

Further, the method has the step of: defining the at least one application parameter AP by means of the application program SP; making the at least one defined application parameter AP available to the application parameter manager APV by means of a pilot module KM. The pilot module KM is added to the application program SP, in particular integrated into the application program SP. In detail, the pilot module KM is designed to make the at least one defined application parameter AP available to the application parameter manager APV.

Moreover, the method has the step of: managing at least one device parameter GP by means of a device parameter manager GPV. The device parameter manager GPV is added to firmware FW on the electrical control unit 20, in particular integrated into the firmware FW. In detail, the device parameter manager GPV is designed to manage the at least one device parameter GP.

The electrical control unit 20 has the device parameter manager GPV for managing the at least one device parameter GP. The device parameter manager GPV is added to the firmware FW on the control unit 20, in particular integrated into the firmware FW.

In addition, the system 5 has a user-operable control device 60 in the form of a management PC with an output device in the form of a display and an adjusting device or an input device in the form of a keyboard and a mouse for a user to manage the at least one application parameter AP and/or the at least one device parameter GP.

In the exemplary embodiment shown, the user-operable control device 60 is produced apart from the drive system 10 or its electrical control unit 20. The control device 60 is coupled to the control unit 20 and is in data contact with the control unit 20 for the purpose of interchanging data DA, in particular via an interface 50 of the control unit 20, as indicated in FIG. 1 by a solid line. Before and/or after management, the control device does not need to be in data contact with the control unit. In alternative exemplary embodiments, the control unit and/or the drive system can have the control device.

Additionally, the method has the step of: distributing data DA from outside the electrical control unit 20, in particular from the user-operable control device 60, relating to the at least one application parameter AP or the at least one device parameter GP by means of a parameter manager distributor PVV on the control unit 20. The parameter manager distributor PVV distributes data DA relating to the at least one device parameter GP to the device parameter manager GPV and distributes data DA relating to the at least one application parameter AP to the application parameter manager APV. In detail, the parameter manager distributor PVV is designed to distribute data DA relating to the at least one device parameter GP to the device parameter manager GPV and to distribute data DA relating to the at least one application parameter AP to the application parameter manager APV.

As the exemplary embodiments shown that are explained above demonstrate, the invention provides an advantageous method for operating an application program for execution on an electrical control unit for a drive system that facilitates operation of the application program, and an electrical control unit, a drive system having an electrical control unit of this kind and a system having an electrical control unit of this kind and/or a drive system of this kind.

What is claimed is:

1. A method for operating an application program for execution on an electrical control unit for a drive system, the method comprising the steps of:
   providing an application parameter manager; and
   managing at least one application parameter by way of the application parameter manager,
   wherein the electrical control unit comprises at least one of a microprocessor or a field programmable gate array for executing the application program;
   wherein the application program runs on a firmware on the electrical control unit,
   wherein the application parameter is a parameter of the application program,
   wherein the application parameter manager is added to the application program,
   wherein the application parameter manager is not added to the firmware on the electrical control unit,
   wherein the method further comprises the step of managing at least one device parameter by way of a device parameter manager,
   wherein the device parameter manager is added to the firmware on the electrical control unit, and wherein the device parameter manager is integrated into the firmware.

2. The method according to claim 1, further comprising the step of:
defining the at least one application parameter by way of the application program; and
making the at least one defined application parameter available to the application parameter manager via a pilot module added to the application program.

3. The method according to claim 1, further comprising the steps of:
distributing data from outside the electrical control unit relating to the at least one application parameter or the at least one device parameter by way of a parameter manager distributor on the electrical control unit, wherein
the parameter manager distributor distributes data relating to the at least one device parameter to the device parameter manager and distributes data relating to the at least one application parameter to the application parameter manager.

4. The method according to claim 1, wherein
the electrical control unit is a frequency converter, a servo converter, a motion controller or a Visu controller.

5. An electrical control unit for a drive system, comprising:
an application program for execution on the electrical control unit,
at least one of a microprocessor or a field programmable gate array for executing the application program; and
an application parameter manager, wherein the application parameter manager is designed to manage at least one application parameter,
wherein the application program runs on a firmware on the electrical control unit,
wherein the application parameter is a parameter of the application program,
wherein the application parameter manager is added to the application program, and
wherein the application parameter manager is not added to the firmware on the electrical control unit,
wherein the electrical control unit further comprises a device parameter manager,
wherein the device parameter manager is designed to manage at least one device parameter,
wherein the device parameter manager is added to the firmware on the electrical control unit, and
wherein the device parameter manager is integrated into the firmware.

6. A drive system, comprising:
an actuator; and
an electrical control unit according to claim 5, wherein the electrical control unit is designed to control the actuator.

7. The drive system according to claim 6, wherein the actuator is an electric motor.

8. A system, comprising:
an actuator;
an electrical control unit comprising an application program for execution on the electrical control unit and an application parameter manager, wherein the application parameter manager is designed to manage at least one application parameter; and
a user operable control device by which a user manages the at least one application parameter,
wherein the application program runs on a firmware on the electrical control unit,
wherein the application parameter is a parameter of the application program,
wherein the application parameter manager is added to the application program, and
wherein the application parameter manager is not added to the firmware on the electrical control unit,
wherein the electrical control unit further comprises a device parameter manager,
wherein the device parameter manager is designed to manage at least one device parameter,
wherein the device parameter manager is added to the firmware on the electrical control unit, and
wherein the device parameter manager is integrated into the firmware.

9. The system according to claim 8,
wherein the user operable control device allows the user to manage the at least one device parameter.

* * * * *